(12) United States Patent
Odai et al.

(10) Patent No.: US 11,964,621 B2
(45) Date of Patent: Apr. 23, 2024

(54) VEHICLE SEATBELT DEVICE

(71) Applicant: HONDA MOTOR CO., LTD., Tokyo (JP)

(72) Inventors: Shinsuke Odai, Wako (JP); Yuji Yasui, Wako (JP); Kenji Komori, Wako (JP); Yosuke Sakamoto, Wako (JP); Yosuke Koike, Wako (JP); Kenshi Torikai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 171 days.

(21) Appl. No.: 17/585,615

(22) Filed: Jan. 27, 2022

(65) Prior Publication Data

US 2022/0242350 A1 Aug. 4, 2022

(30) Foreign Application Priority Data

Feb. 4, 2021 (JP) .................................. 2021-016673

(51) Int. Cl.
*B60R 21/01* (2006.01)
*B60K 35/00* (2006.01)
(Continued)

(52) U.S. Cl.
CPC .............. *B60R 21/01* (2013.01); *B60K 35/00* (2013.01); *B60R 22/48* (2013.01); *B60K 35/22* (2024.01);
(Continued)

(58) Field of Classification Search
CPC .................... B60R 21/01; B60R 22/48; B60R 2021/01272; B60R 2022/4808;
(Continued)

(56) References Cited

U.S. PATENT DOCUMENTS

| 6,082,764 A | 7/2000 | Seki et al. |
| 2009/0212974 A1* | 8/2009 | Chiba .................... B60Q 9/006 340/425.5 |

(Continued)

FOREIGN PATENT DOCUMENTS

| JP | 11-020606 | 1/1999 |
| JP | 11-348730 | 12/1999 |

(Continued)

OTHER PUBLICATIONS

Japanese Office Action for Japanese Patent Application No. 2021-016673 dated Aug. 9, 2022.
(Continued)

*Primary Examiner* — Yi-Kai Wang
(74) *Attorney, Agent, or Firm* — Amin, Turocy & Watson, LLP

(57) ABSTRACT

A vehicle seatbelt device of an embodiment includes a recognizer that recognizes circumstances around a vehicle, a steering operator that is able to adjust steering of the vehicle, a vibrator that causes a portion of the steering operator to vibrate, a seatbelt that restrains a portion of the body of an occupant of the vehicle, a tension adjustment mechanism that is able to adjust the tension of the seatbelt, and a controller that controls the vibrator and the tension adjustment mechanism on the basis of the circumstances recognized by the recognizer.

7 Claims, 18 Drawing Sheets

(51) Int. Cl.
  *B60R 22/48* (2006.01)
  *B60K 35/22* (2024.01)

(52) U.S. Cl.
  CPC .............. *B60R 2021/01272* (2013.01); *B60R 2022/4808* (2013.01)

(58) Field of Classification Search
  CPC . B60R 22/46; B60R 2022/4685; B60K 35/00; B60K 2370/152; B60K 2370/178; B60K 2370/29; B60Q 9/00
  USPC .......................................................... 701/45
  See application file for complete search history.

(56) References Cited

U.S. PATENT DOCUMENTS

| | | | | |
|---|---|---|---|---|
| 2012/0271484 | A1* | 10/2012 | Feit ...................... | G01S 13/931 701/1 |
| 2020/0082818 | A1* | 3/2020 | Koga ...................... | G06F 3/167 |
| 2020/0180553 | A1* | 6/2020 | Kim ...................... | B60W 40/09 |
| 2021/0016791 | A1* | 1/2021 | Elkins .................. | B60W 50/16 |

FOREIGN PATENT DOCUMENTS

| | | |
|---|---|---|
| JP | 2001-199296 | 7/2001 |
| JP | 2005-088717 | 4/2005 |
| JP | 2005-200001 | 7/2005 |
| JP | 2007-072658 | 3/2007 |
| JP | 2009-015787 | 1/2009 |
| JP | 2011-086204 | 4/2011 |
| JP | 2015-102891 | 6/2015 |
| JP | 2016-024673 | 2/2016 |
| JP | 2017-021476 | 1/2017 |
| JP | 2020-057080 | 4/2020 |
| KR | 10-2043954 | 11/2019 |
| WO | 2017/126221 | 7/2017 |
| WO | 2020/235303 | 11/2020 |

OTHER PUBLICATIONS

Japanese Office Action for Japanese Patent Application No. 2021-016673 dated Nov. 15, 2022.
Chinese Office Action for Chinese Patent Application No. 202210089231.9 dated Aug. 26, 2023.

* cited by examiner

VEHICLE SEATBELT DEVICE

CROSS-REFERENCE TO RELATED APPLICATION

This application is based upon and claims the benefit of priority from Japanese Patent Application No. 2021-016673, filed Feb. 4, 2021, the entire contents of which is incorporated herein by reference.

BACKGROUND

Field of the Invention

The present invention relates to a vehicle seatbelt device.

Description of Related Art

Technologies for detecting a pedestrian and technologies for controlling a seatbelt are known (for example, refer to Japanese Unexamined Patent Application, First Publication No. 2007-72658, Japanese Unexamined Patent Application, First Publication No. 2005-200001, and Japanese Unexamined Patent Application, First Publication No. H11-348730).

SUMMARY

In the technologies in the related art, safety of a driver of a host vehicle and an area around the host vehicle may not be sufficient, and thus there is room for further improvement in safety.

The present invention has been made in consideration of such circumstances, and an object thereof is to provide a vehicle seatbelt device in which safety of a driver of a host vehicle and the area around the host vehicle can be further improved.

A vehicle seatbelt device according to this invention employs the following constitutions.

(1) A first aspect of the present invention is a vehicle seatbelt device including a recognizer that recognizes circumstances around a vehicle, a steering operator that is able to adjust steering of the vehicle, a vibrator that causes a portion of the steering operator to vibrate, a seatbelt that restrains a portion of the body of an occupant of the vehicle, the tension adjustment mechanism that is able to adjust the tension of the seatbelt, and a controller that controls the vibrator and the tension adjustment mechanism on the basis of the circumstances recognized by the recognizer.

(2) According to a second aspect of the present invention, in the first aspect, the controller controls the vibrator to cause a part of the steering operator on a left side from the viewpoint of the occupant to vibrate more intensively than a part on a right side when the recognizer recognizes that an object to be watched carefully by the occupant is present on the left side from the viewpoint of the occupant, and controls the vibrator to cause a part of the steering operator on the right side from the viewpoint of the occupant to vibrate more intensively than a part on the left side when the recognizer recognizes that an object to be watched carefully by the occupant is present on the right side from the viewpoint of the occupant.

(3) According to a third aspect of the present invention, in the first or second aspect, the controller controls the tension adjustment mechanism to adjust the tension of the seatbelt when the recognizer recognizes that an object to be watched carefully by the occupant is present behind from the viewpoint of the occupant.

(4) According to a fourth aspect of the present invention, in any one of the first to third aspects, the vehicle seatbelt device further includes a detector that detects a direction of a visual line or the face of the occupant. The controller controls the vibrator and the tension adjustment mechanism on the basis of the circumstances recognized by the recognizer and the direction detected by the detector.

(5) According to a fifth aspect of the present invention, in the fourth aspect, when an object to be watched carefully by the occupant is present around the vehicle and the occupant has not directed a visual line or the face to the object, the controller controls the vibrator to cause a part of the steering operator on a first side where the object is present to vibrate more intensively than a part of the steering operator on a second side where the object is not present.

(6) According to a sixth aspect of the present invention, in the fourth or fifth aspect, when an object to be watched carefully by the occupant is present behind from the viewpoint of the occupant and the occupant has not directed a visual line or the face to the object, the controller controls the tension adjustment mechanism to cause the tension of the seatbelt to be more intensified than when an object to be watched carefully by the occupant is present behind from the viewpoint of the occupant and the occupant has directed a visual line or the face to the object.

(7) According to a seventh aspect of the present invention, in any one of the first to sixth aspects, the controller controls the vibrator to cause the steering operator to vibrate and then controls the tension adjustment mechanism to adjust the tension of the seatbelt.

(8) According to an eighth aspect of the present invention, in any one of the first to seventh aspects, the vehicle seatbelt device further includes an outputter that outputs information. The controller causes the outputter to output information on the basis of the circumstances recognized by the recognizer.

(9) According to a ninth aspect of the present invention, in the eighth aspect, the outputter includes a display. The controller causes the display to display an image of a personified character.

According to the foregoing aspects, the safety of a driver of a host vehicle and an area around the host vehicle can be further improved.

DESCRIPTION OF EMBODIMENTS

Hereinafter, an embodiment of the present invention will be described with reference to the drawings. In the present embodiment, a case in which regulations for left-hand traffic are applied will be described as an example. However, when regulations for right-hand traffic are applied, the left and right sides may be read in reverse.

Figure 1:
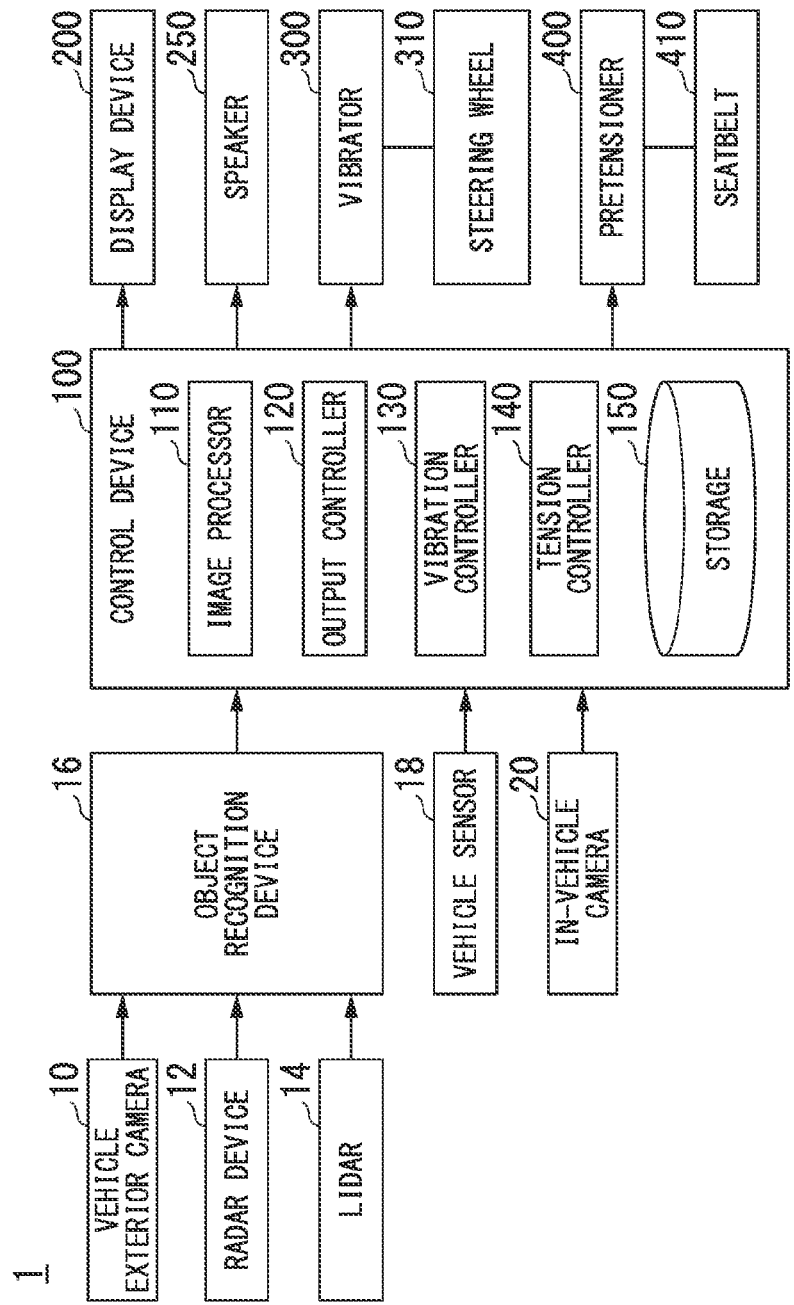
FIG. 1 is a view showing an example of a constitution of a vehicle seatbelt device.

FIG. 1 is a view showing an example of a constitution of a vehicle seatbelt device 1. For example, the vehicle seatbelt device 1 includes a vehicle exterior camera 10, a radar device 12, a light detection and ranging (LIDAR) 14, an object recognition device 16, a vehicle sensor 18, an in-vehicle camera 20, a control device 100, a display device 200, a speaker 250, a vibrator 300, a steering wheel 310, a pretensioner 400, and a seatbelt 410. Hereinafter, a vehicle in which the vehicle seatbelt device 1 is mounted will be referred to as a host vehicle M in the description. An instrument in which some or all of the vehicle exterior camera 10, the radar device 12, the LIDAR 14, and the object recognition device 16 are combined is an example of "a recognizer".

For example, the vehicle exterior camera 10 is a digital camera utilizing a solid-state image capturing element such as a charge coupled device (CCD) or a complementary metal oxide semiconductor (CMOS). The vehicle exterior camera 10 is attached to an arbitrary place in the host vehicle M. The vehicle exterior camera 10 is attached to an upper part of a front windshield, a rear surface of a rear-view mirror, a front head of a vehicle body, or the like. When an image of a side behind the vehicle is captured, the vehicle exterior camera 10 may be attached to an upper part of a rear windshield, a back door, or the like or may be attached to a side mirror or the like.

The radar device 12 radiates radio waves such as millimeter waves to the vicinity of the host vehicle M and detects at least a position (a distance and an azimuth) of an object in the vicinity by detecting radio waves (reflected waves) reflected by the object. The radar device 12 is attached to an arbitrary place in the host vehicle M. The radar device 12 may detect a position and a speed of an object by a frequency modulated continuous wave (FM-CW) method.

The LIDAR 14 emits light to the vicinity of the host vehicle M and measures scattered light. The LIDAR 14 detects a distance to a target on the basis of a time from light emission to light reception. For example, emitted light is pulsed laser light. The LIDAR 14 is attached to an arbitrary place in the host vehicle M.

The object recognition device 16 recognizes a position, a kind, a speed, and the like of an object in the vicinity of the host vehicle M by performing sensor fusion processing with respect to detection results by some or all of the vehicle exterior camera 10, the radar device 12, and the LIDAR 14. Examples of an object include a different vehicle (for example, a peripheral vehicle present within a predetermined distance), a pedestrian, a bicycle, and a road structure. Examples of a road structure include a road sign, a traffic signal, a railroad crossing, a curbstone, a medial divider, a guardrail, and a fence. In addition, examples of a road structure may include a road demarcation line (which will hereinafter be referred to as a demarcation line) and a crosswalk which are painted or adhered on a road surface, and a road surface sign such as a bicycle crossing lane or a stop sign line. In addition, an object may include an obstacle such as a fallen object on a road (for example, a load of a different vehicle or a signboard installed in the vicinity of a road). The object recognition device 16 outputs recognition results to the control device 100. The object recognition device 16 may output detection results of the vehicle exterior camera 10, the radar device 12, and the LIDAR 14 to the control device 100 without any change. In this case, the control device 100 may have functions of the object recognition device 16.

The vehicle sensor 18 includes a vehicle speed sensor for detecting a speed of the host vehicle M, an acceleration sensor for detecting an acceleration, a yaw rate sensor for detecting a yaw rate (for example, a rotation angular speed about a vertical axis passing through a centroidal point of the host vehicle M), an azimuth sensor for detecting a direction of the host vehicle M, and the like. The vehicle sensor 18 outputs signals indicating detection results such as speed, virtual degree yaw rate, and azimuth angle to the control device 100.

Similar to the vehicle exterior camera 10, for example, the in-vehicle camera 20 is a digital camera utilizing a solid-state image capturing element such as a CCD or a CMOS. For example, the in-vehicle camera 20 is installed in the middle of an instrument panel of the host vehicle M and captures an image of the inside of a compartment. The in-vehicle camera 20 particularly captures an image of a driver of the host vehicle M and an occupant in a passenger seat and outputs the image to the control device 100.

For example, the control device 100 includes an image processor 110, an output controller 120, a vibration controller 130, a tension controller 140, and a storage 150. For example, these constituent elements are realized by a hardware processor such as a central processing unit (CPU) executing a program (software). Some or all of these constituent elements may be realized by hardware (a circuit; including circuitry) such as a large scale integration (LSI), an application specific integrated circuit (ASIC), a field-programmable gate array (FPGA), or a graphics processing unit (GPU), or may be realized by software and hardware in cooperation. A program may be stored in the storage 150 in advance or may be stored in an attachable/detachable storage medium (a non-transitory storage medium) such as a DVD or a CD-ROM such that the program is installed in the storage 150 when the storage medium is mounted in a drive device. The control device 100 is an example of "a controller".

The image processor 110 analyzes an image captured by the in-vehicle camera 20 and detects a direction of a visual line or a direction of the face of an occupant (particularly, a driver) of the host vehicle M. An instrument in which the in-vehicle camera 20 and the image processor 110 are combined is an example of "a detector".

The output controller 120 causes the display device 200 to three-dimensionally display a personified image (which will be described below) or the like or causes the speaker 250 to output audio.

The vibration controller 130 controls the vibrator 300 to cause the steering wheel 310 to vibrate. The tension controller 140 controls the pretensioner 400 to adjust the tension of the seatbelt 410.

For example, the storage 150 is realized by an HDD, a flash memory, an electrically erasable programmable read only memory (EEPROM), a read only memory (ROM), a random-access memory (RAM), or the like. For example, the storage 150 stores a program which is read and executed by the processor.

The display device 200 displays information output by the control device 100 as an image. For example, the display device 200 is a three-dimensional display (a hologram display) such as a looking glass having a lenticular lens structure. The display device 200 is an example of "an outputter" and "a display".

Figure 2:
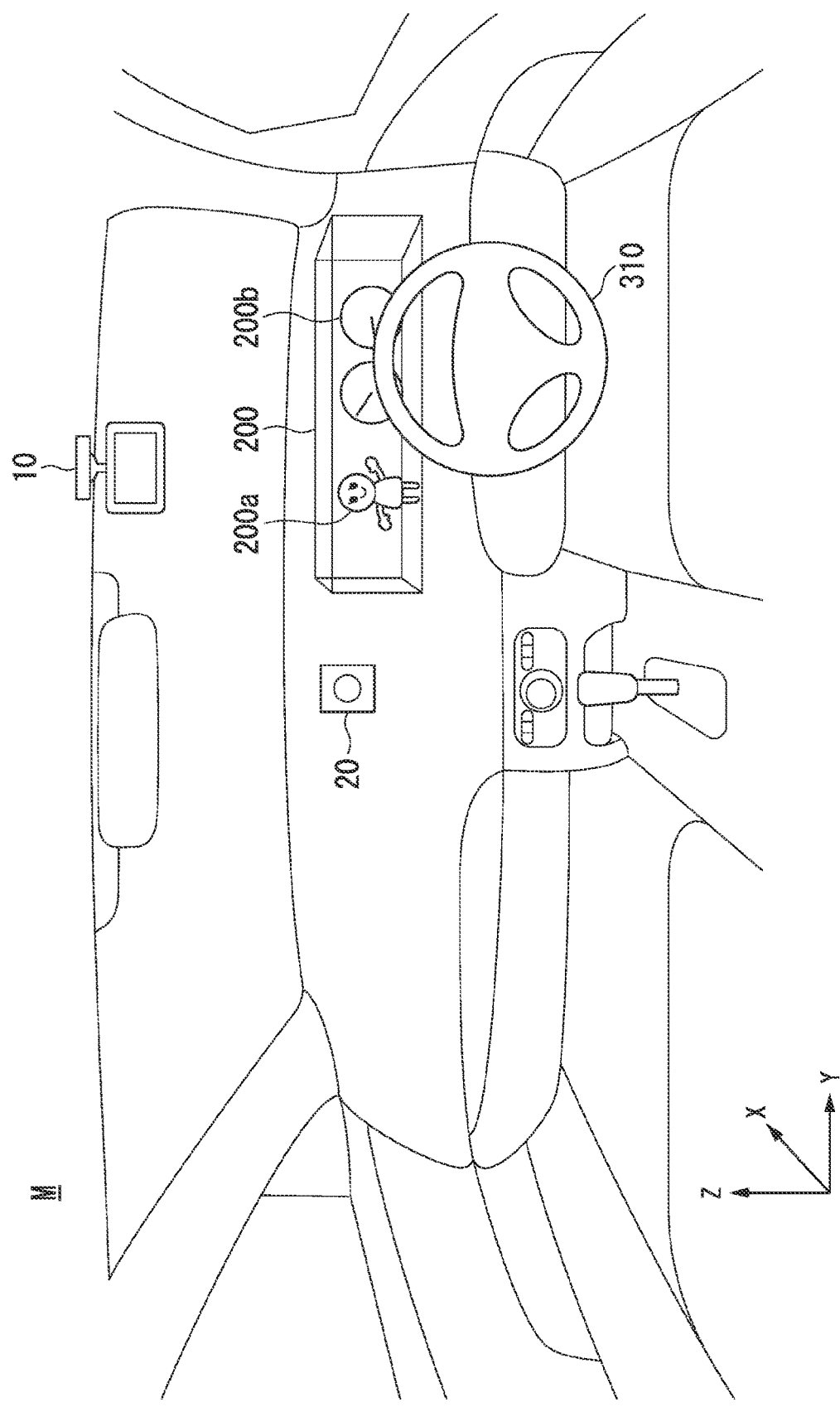
FIG. 2 is a view illustrating an example of an inside of a host vehicle in which a display device is mounted.

FIG. 2 is a view illustrating an example of an inside of the host vehicle M in which the display device 200 is mounted. As illustrated in FIG. 2, the display device 200 is installed at a position in the instrument panel facing a driver's seat. For example, the display device 200 displays a personified image 200a and a speedometer 200b. A personified image may be an image showing a human, an animal, a plant, a robot, or a different entity which is actually present or may be an image showing a fictional character (a character). Typically, a personified image is an image in which an item personified by animation moves.

Figure 3:
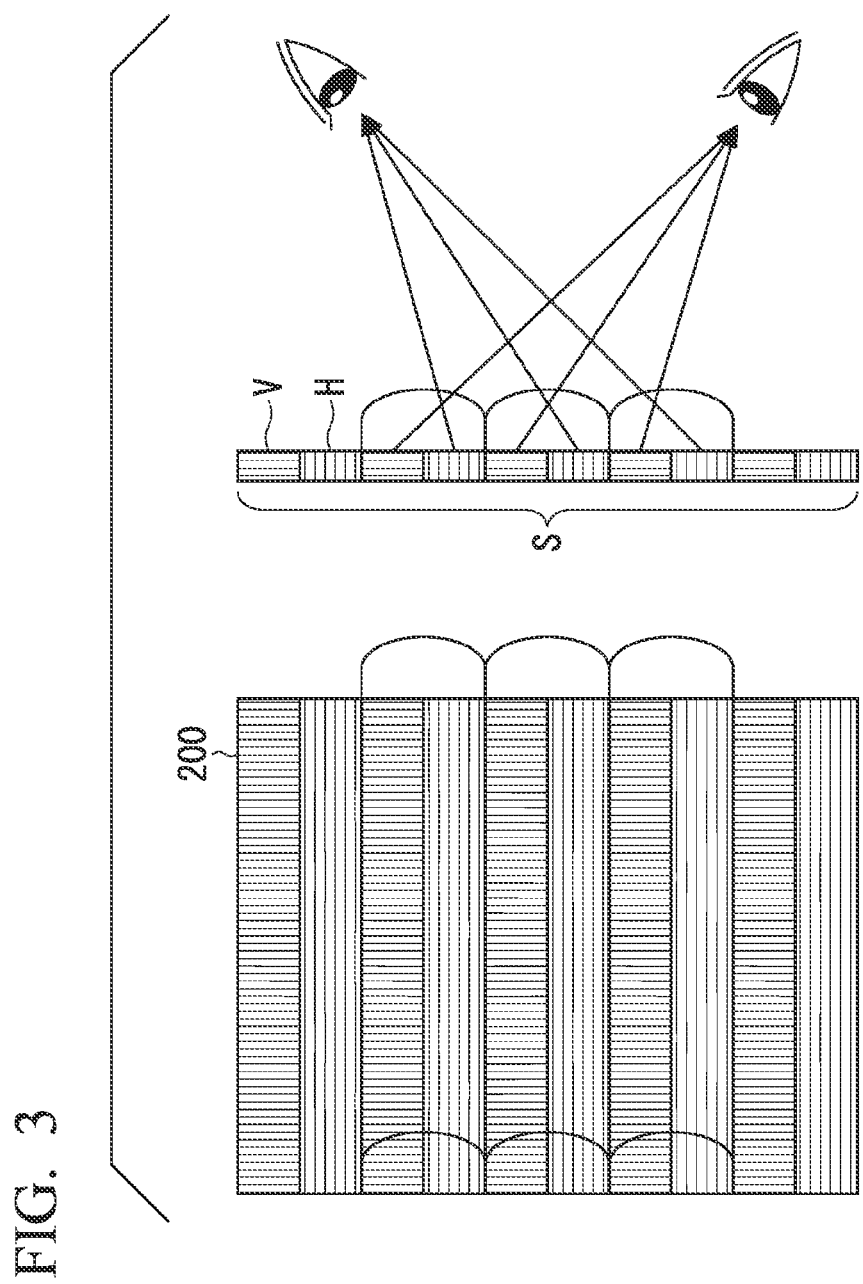
FIG. 3 is an explanatory view for a lenticular lens structure of the display device.

FIG. 3 is an explanatory view for a lenticular lens structure of the display device 200. In FIG. 3, a sheet (a lenticular lens) S in which innumerable micro-dome-shaped convex lenses are arranged is disposed on an image that is referred to as a lenticular image in which images of two kinds such as a vertical line V and a horizontal line H are combined. Since there is a parallax between two eyes of a user, one eye recognizes images of the vertical lines, and the other eye recognizes images of the horizontal lines through the sheet S. Accordingly, a user can recognize an image having a stereoscopic effect.

Description will return to FIG. 1. The speaker 250 outputs information output by the control device 100 as an audio. The speaker 250 is another example of "an outputter".

The vibrator 300 is embedded inside a portion of a casing such as a rim or a spoke of the steering wheel 310 or is attached to a surface of the casing. Typically, the vibrator 300 is provided one each on both the rim on the left side and the rim on the right side when viewed from the driver.

The steering wheel 310 is an annular component which can adjust steering of the host vehicle M (a forward movement direction). In place of the steering wheel 310, a steering wheel having a different shape that is not an annular shape may be provided or a different operator such as a joystick may be provided in the host vehicle M. In this case, the vibrator 300 may be attached to a steering wheel having a different shape, a joystick, or the like. The steering wheel 310, a steering wheel having a different shape, a joystick, or the like is an example of "a steering operator".

The pretensioner 400 includes a mechanism for drawing in (winding) the seatbelt 410 in order to eliminate looseness of the seatbelt 410. The seatbelt 410 is a belt-shaped safety device for restraining the body of an occupant in the seat. For example, the pretensioner 400 intensifies the tension of the seatbelt 410 in stages by means of driving of a motor and operates so as to intensify a restraining force of the seatbelt 410. The pretensioner 400 is an example of "a tension adjustment mechanism".

Figure 4:
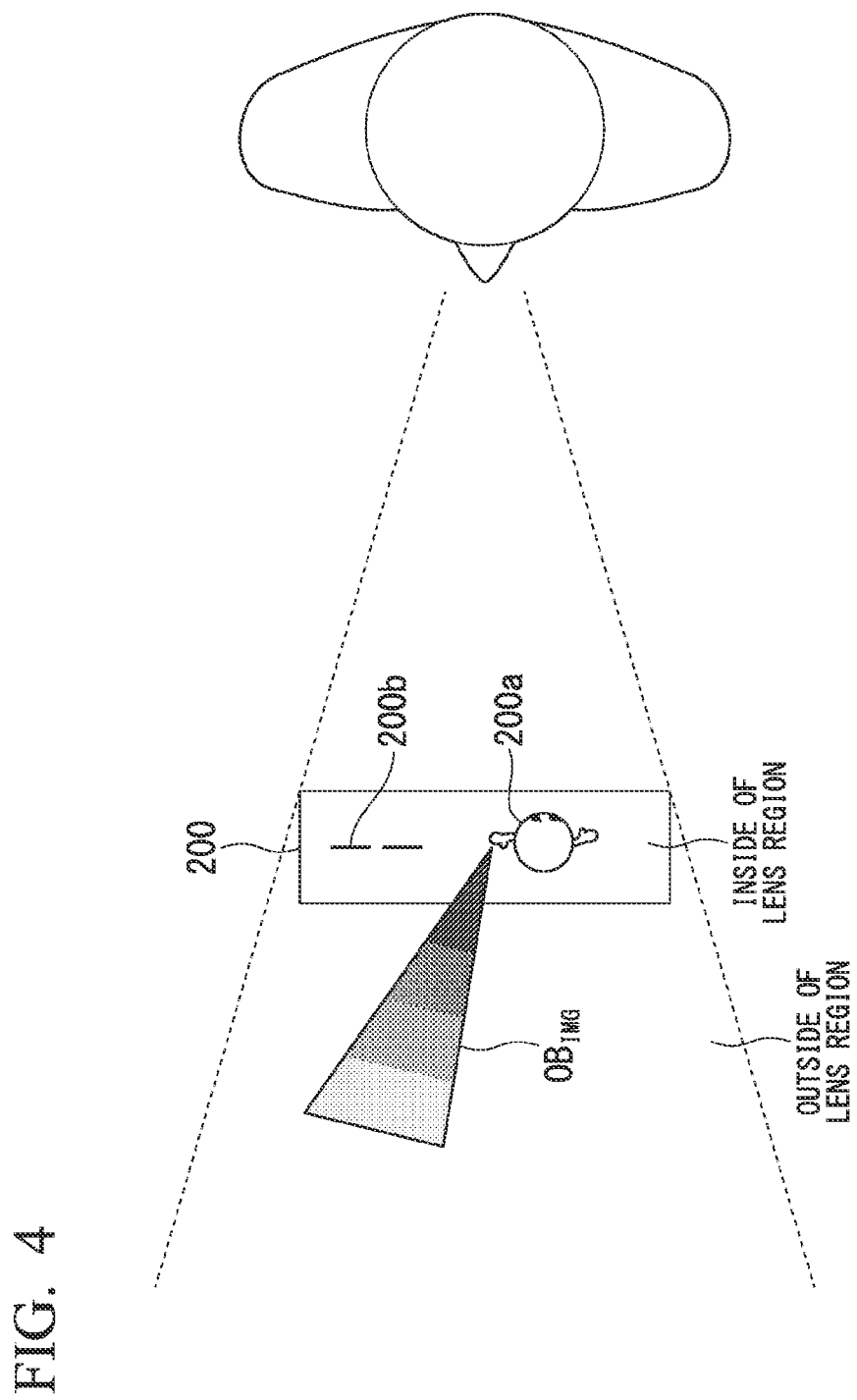
FIG. 4 is an explanatory view for a function of the display device.

FIG. 4 is an explanatory view for a function of the display device 200. In FIG. 4, in addition to the personified image 200a and the speedometer 200b, the display device 200 continuously displays an image object $OB_{IMG}$ spreading toward a side behind the personified image 200a. For example, the image object $OB_{IMG}$ is displayed in a form of light, sand, or the like. Since the display device 200 can form an image in both the inside of a lens region and the outside of the lens region, a user can three-dimensionally recognize the image object $OB_{IMG}$ spreading from the inside of the lens region toward the outside of the lens region. Meanwhile, the display device 200 also has characteristics in which visibility of an image formed outside the lens region is inferior to visibility of an image formed inside the lens region.

In FIG. 4, the display device 200 displays the image object $OB_{IMG}$ in a shape of a continuous group, but a method of displaying the image object $OB_{IMG}$ is not limited thereto. For example, the display device 200 may display the image object $OB_{IMG}$ as a group of a plurality of elements which are intermittently distributed or may display it such that a plurality of elements flow in a certain direction.

Figure 5:
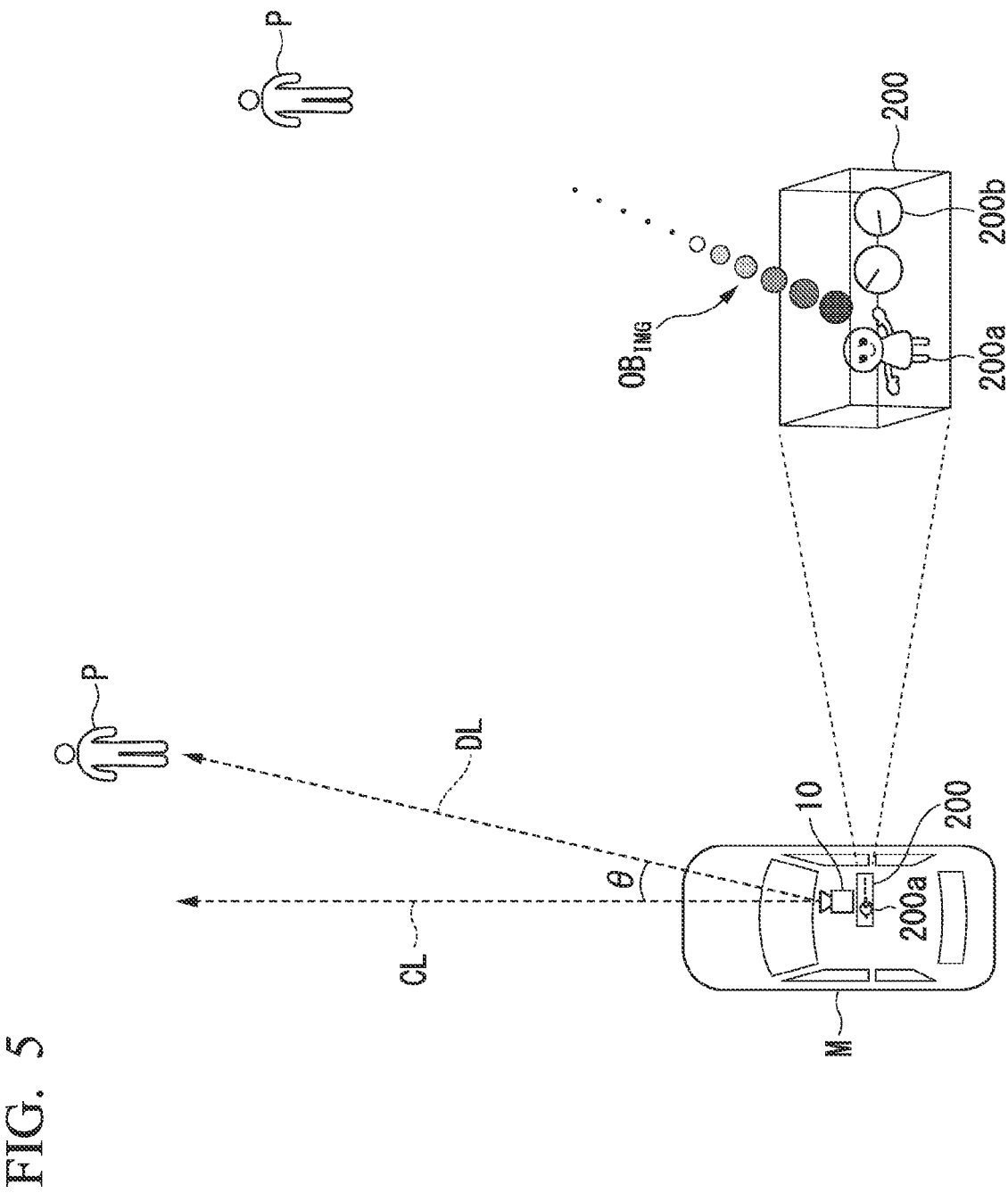
FIG. 5 is an explanatory view for a relationship between detection of an object by a vehicle exterior camera and display of an image object by the display device.

Next, a mechanism of notifying a user of the presence of an object in the vicinity of the host vehicle M using the vehicle exterior camera 10 and the display device 200 will be described. FIG. 5 is an explanatory view for a relationship between detection of an object by the vehicle exterior camera 10 and display of the image object $OB_{IMG}$ by the display device 200. Here, an object present in front of the host vehicle M is detected and a distance and an angle between the host vehicle M and an object are measured exclusively using the vehicle exterior camera 10. In FIG. 5, the reference sign CL indicates an axial direction of the vehicle body of the host vehicle M, the reference sign P indicates a pedestrian, the reference sign DL indicates a distance between the host vehicle M and the pedestrian P, and the reference sign θ indicates an angle of a direction of the pedestrian P with respect to the axial direction CL of the vehicle body. The reference sign P is not limited to a pedestrian and may be a different obstacle such as an automobile or a bicycle.

The object recognition device 16 derives information of the distance DL and the angle θ (information of a height may be further included) by performing position conversion processing from an image-capturing space of the vehicle exterior camera 10 into a plane viewed from the sky. This processing may be performed in the display device 200 or may be performed by the processor which belongs to the vehicle exterior camera 10. The display device 200 acquires information of the distance DL and the angle θ from the object recognition device 16.

The output controller 120 obtains a spatial vector from the personified image 200a to the pedestrian P on the basis of the acquired information of the distance DL and the angle θ and information of the height from the personified image 200a of the display device 200 to the vehicle exterior camera 10. The output controller 120 calculates the direction of the image object $OB_{IMG}$ displayed from a hand side of the personified image 200a toward the position of the pedestrian P on the basis of the obtained spatial vector.

Next, the output controller 120 determines a display mode of the image object $OB_{IMG}$ displayed from the hand side of the personified image 200a toward the position of the pedestrian P on the basis of the detection results of the vehicle exterior camera 10 and the calculated direction of the image object $OB_{IMG}$. Specifically, the output controller 120 determines a density, a color intensity, a brightness, a size, or the like of the image object $OB_{IMG}$. The output controller 120 causes the display device 200 to display the image object $OB_{IMG}$ on the basis of the determined display mode.

In this manner, for example, the output controller 120 causes one or more image objects $OB_{IMG}$ to be continuously displayed in a direction of an obstacle (an obstacle recognized by the object recognition device 16) outside the lens region from the inside of the lens region. In the example of FIG. 5, the position of the pedestrian P is an obstacle recognized by the object recognition device 16. Therefore, the image object $OB_{IMG}$ is displayed toward the position of the pedestrian P.

In FIG. 5, the display device 200 displays the punctiform image object $OB_{IMG}$ from the hand side of the personified image 200a toward the position of the pedestrian P. As described above, since the display device 200 has characteristics in which the visibility of an image formed outside the lens region is inferior to the visibility of an image formed inside the lens region, when the image object $OB_{IMG}$ is displayed in the same mode, inferiority of visibility between the inside of the lens region and the outside of the lens region becomes noticeable so that a user may feel a sense of incompatibility. Hence, when the display device 200 displays one or more image objects $OB_{IMG}$ from the inside of the lens region toward the outside of the lens region, the output controller 120 changes parameters such as a density, a color intensity, a brightness, and/or a size of the image object $OB_{IMG}$ near the lens region compared to the image object $OB_{IMG}$ away from an area near the lens region. For example, in FIG. 5, the output controller 120 causes the punctiform image object $OB_{IMG}$ displayed at a position close to the personified image 200a to be larger than the punctiform image object $OB_{IMG}$ away from the personified image 200a. Moreover, the output controller 120 causes the color of the punctiform image object $OB_{IMG}$ close to the personified image 200a to be darker than the color of the punctiform image object $OB_{IMG}$ away from the personified image 200a. In place of this or in addition to this, the output controller 120 may cause the brightness of the punctiform image object $OB_{IMG}$ close to the personified image 200a to be higher than the brightness of the punctiform image object $OB_{IMG}$ away from the personified image 200a. In addition, in place of this or in addition to this, the output controller 120 may cause the density of the punctiform image object $OB_{IMG}$ close to the personified image 200a to be higher than the density of the punctiform image object $OB_{IMG}$ away from the personified image 200a. In this manner, visual discontinuity of the image object $OB_{IMG}$ can be reduced and a sense of incompatibility of a user can be reduced by determining the display mode such that the density, the color intensity, the brightness, and/or the size of the image object $OB_{IMG}$ near the lens region vary compared to the image object $OB_{IMG}$ away from an area near the lens region.

In the present embodiment, the display device 200 displays the image object $OB_{IMG}$ from the hand side of the personified image 200a, but it is not limited thereto. A start point of the image object $OB_{IMG}$ may be at a position on an inward side or in the vicinity of the personified image 200a instead of the hand side of the personified image 200a.

[Processing Flow of Control Device]

Figure 6:
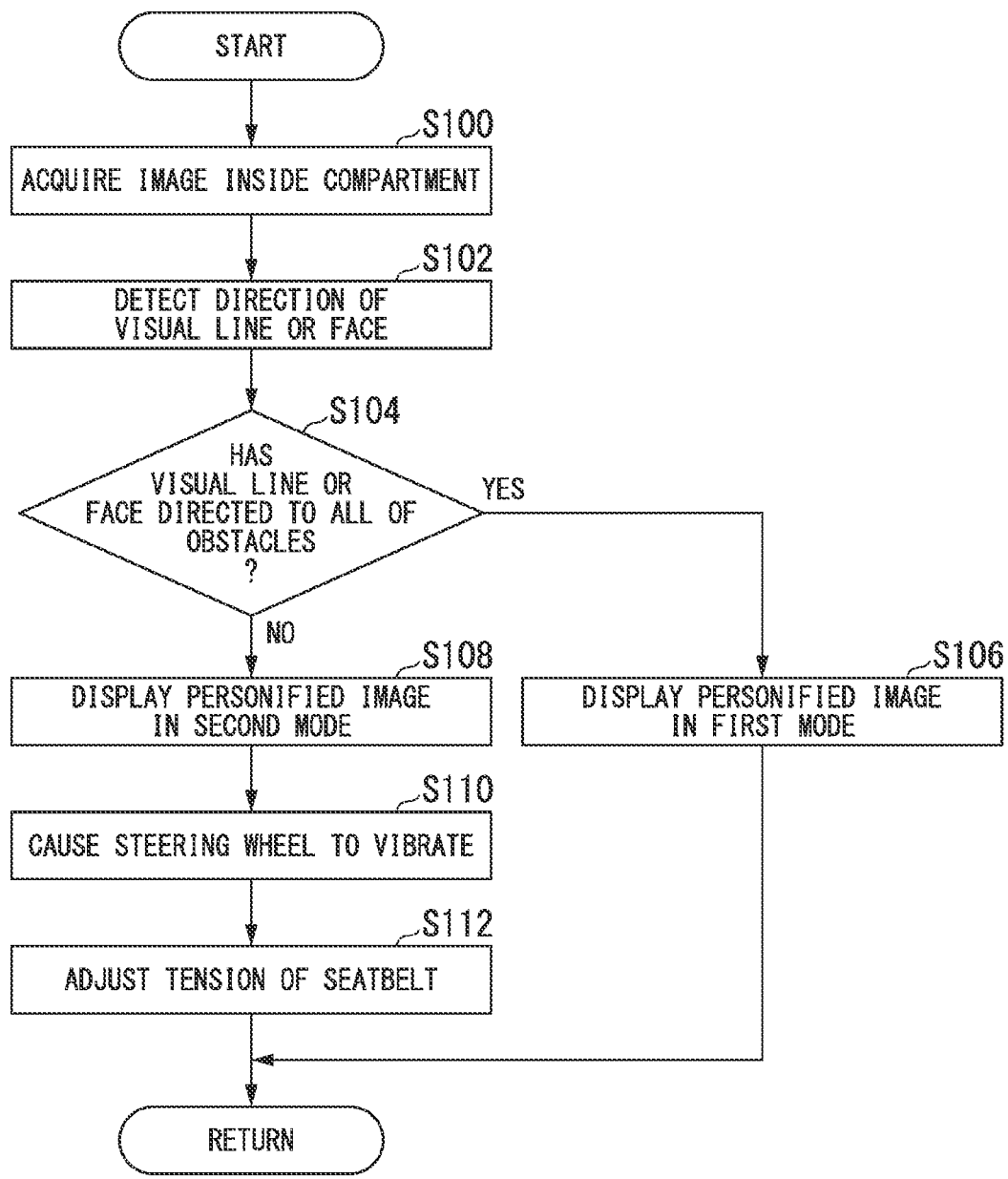
FIG. 6 is a flowchart showing a flow of a series of processing by a control device.

Hereinafter, a series of processing by the control device 100 will be described using a flowchart. FIG. 6 is a flowchart showing a flow of a series of processing by the control device 100. The processing of this flowchart may be repeatedly executed in a predetermined cycle.

First, the image processor 110 acquires an image inside the compartment from the in-vehicle camera 20 (Step S100), analyzes the acquired image, and detects a direction of a visual line or a direction of the face of an occupant (particularly, a driver) of the host vehicle M (Step S102).

Next, the output controller 120 judges whether or not the driver has directed a visual line or the face to all of the obstacles to be watched carefully by the driver of the host vehicle M of one or a plurality of obstacles (a different automobile, a bicycle, a pedestrian, and the like) recognized by the object recognition device 16 (Step S104). Typically, an obstacle to be watched carefully by the driver is an obstacle which is hidden at a blind spot from the host vehicle M (on a lateral side of, on a rear lateral side of, or behind the host vehicle M), but it is not limited thereto. An obstacle may be an obstacle in front thereof on which the driver has to keep an eye. Hereinafter, an obstacle to be watched carefully by the driver of the host vehicle M will be referred to as "a risk point PT". Directing a visual line or the face to the risk point PT will be referred to as "eye-on", and not doing so will be referred to as "eye-off" in the description.

For example, the output controller 120 may calculate an angle formed by a vector indicating a direction in which the risk point PT is present and a vector indicating the direction of a visual line or the direction of the face of the driver. It may be judged as eye-on when the formed angle is within an allowable angle, and it may be judged as eye-off when the formed angle is out of the allowable angle. An allowable angle is an angle to the extent that two vectors can be regarded as vectors in the same direction and may be an angle within a range of approximately several degrees to tens of degrees, for example.

When the driver has directed a visual line or the face to the risk point PT (a case of eye-on), the output controller 120 causes the display device 200 to display the personified image 200a or the image object $OB_{IMG}$ in a first mode (Step S106). At this time, the output controller 120 may cause the speaker 250 to output an audio in the first mode. The processing of this flowchart hereby ends.

Meanwhile, when the driver has not directed a visual line or the face to the risk point PT (a case of eye-off), the output controller 120 causes the display device 200 to display the personified image 200a or the image object $OB_{IMG}$ in a second mode (Step S108). At this time, the output controller 120 may cause the speaker 250 to output an audio in the second mode.

Next, the vibration controller 130 controls the vibrator 300 to cause the steering wheel 310 to vibrate (Step S110).

Next, the tension controller 140 controls the pretensioner 400 to adjust the tension of the seatbelt 410 (Step S112). The processing of this flowchart hereby ends.

Figure 7:
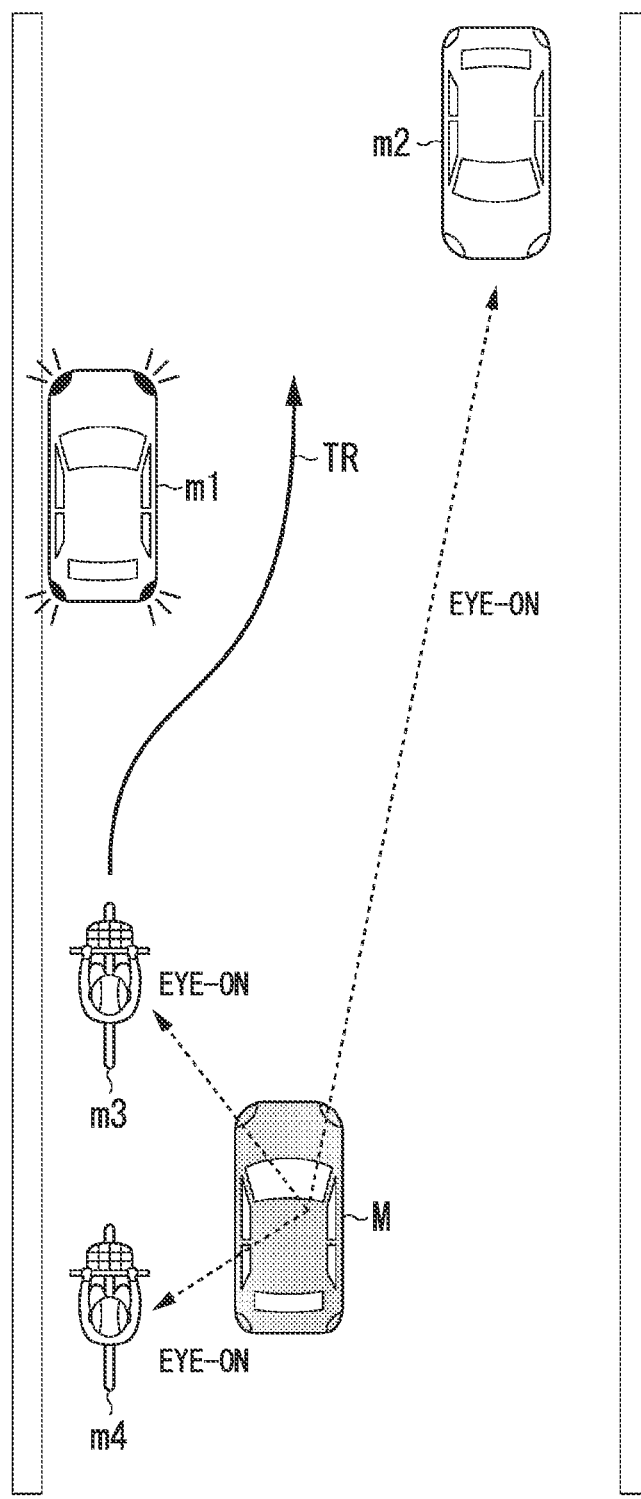
FIG. 7 is a view illustrating a scene in which a driver has directed a visual line or the face to all of risk points.

FIG. 7 is a view illustrating a scene in which a driver has directed a visual line or the face to all of the risk points PT. In this scene, regulations for left-hand traffic are applied. The reference sign m1 in the diagram indicates a preceding vehicle which has stopped on a road shoulder in front of the host vehicle M. The reference sign m2 indicates an oncoming vehicle which is present in front of the host vehicle M. The reference signs m3 and m4 indicate bicycles which travel on the left side of the host vehicle M.

In the illustrated scene, the host vehicle M is traveling on a road having no centerline, and the preceding vehicle m1 has stopped on a road shoulder. For this reason, a space on the right side of the preceding vehicle m1 is narrowed so that two vehicles cannot pass through at the same time while passing by each other. Moreover, since the oncoming vehicle m2 is closer to the preceding vehicle m1 than the host vehicle M, it is postulated that the oncoming vehicle m2 will pass through the space on the right side of the preceding vehicle m1 earlier based on traffic rules or habitually. Namely, it can be presumed that the oncoming vehicle m2 has priority. In this case, there is a need for the host vehicle M to temporarily stop behind the preceding vehicle m1 or slow down. At this time, as indicated by a trajectory TR in the diagram, it is postulated that the bicycles m3 and m4 will pass by the host vehicle M which will stop or slow down (pass by the left side of the host vehicle M) and move forward in front of the host vehicle M.

Under such circumstances, it is desired for the driver of the host vehicle M to carefully watch the oncoming vehicle m2 until the oncoming vehicle m2 passes through and more carefully watch the bicycles m3 and m4 which are likely to be involved when the host vehicle M is started or accelerated. Therefore, the output controller 120 regards the oncoming vehicle m2 and the bicycles m3 and m4 as the risk points PT and judges whether or not the driver has directed a visual line or the face to each of the three risk points PT. In the illustrated example, the driver has directed a visual line or the face to each of the three risk points PT (the driver is in an eye-on state with respect to all of the risk points PT). In such a case, the display device 200, the vibrator 300, and the pretensioner 400 are controlled by a control method which will be described below. Particularly, the display device 200 displays the personified image 200a or the image object $OB_{IMG}$ in the first mode.

Figure 8:
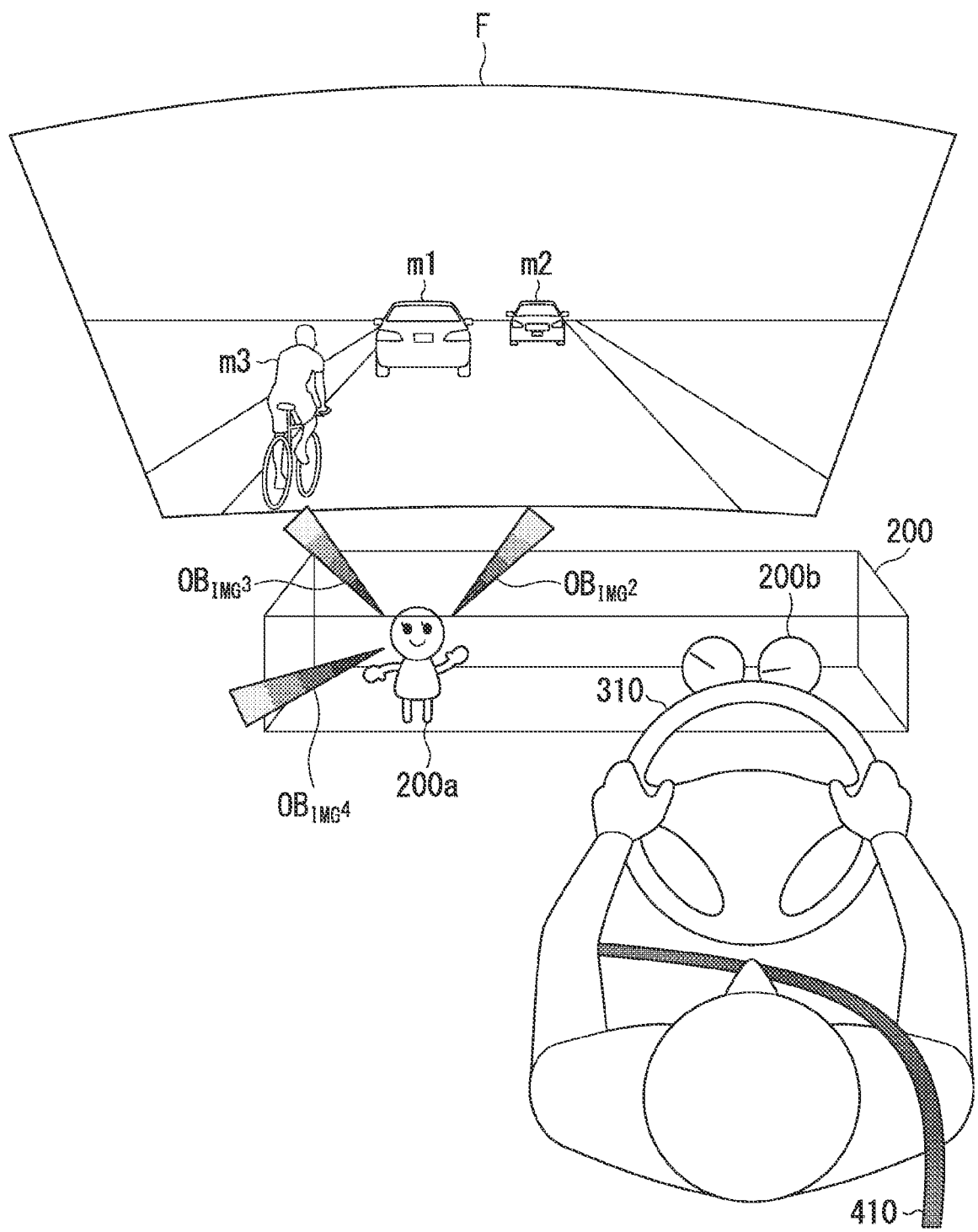
FIG. 8 is an explanatory view for a method of controlling each of instruments in the scene of FIG. 7.

FIG. 8 is an explanatory view for a method of controlling each of instruments in the scene of FIG. 7. For example, when the host vehicle M encounters the scene of FIG. 7, although the driver can visually recognize the preceding vehicle m1, the oncoming vehicle m2, and the bicycle m3 over a front windshield F of the host vehicle M. However, since the bicycle m4 is positioned behind from the viewpoint of the driver, there is a need for the driver to look back to check the side behind the host vehicle M or utilize the rear-view mirror or the side mirror to check the side behind the host vehicle M.

For example, it is assumed that the driver has directed a visual line or the face to the oncoming vehicle m2 and the bicycles m3 and m4 (the risk points PT). In this case, in the first mode, the output controller 120 causes the image objects $OB_{IMG}$ to be displayed in directions in which the respective risk points PT are present. Specifically, the output controller 120 causes an image object $OB_{IMG}2$ indicating a direction in which the oncoming vehicle m2 is present, an image object $OB_{IMG}3$ indicating a direction in which the bicycle m3 is present, and an image object $OB_{IMG}4$ indicating a direction in which the bicycle m4 is present to be displayed by being disposed around the personified image 200a. At this time, the output controller 120 may cause a portion of the character (for example, a hand, a foot, or the face) displayed as the personified image 200a to move by animation.

When the driver has directed a visual line or the face to all of the risk points PT, the vibration controller 130 does not control the vibrator 300, and the tension controller 140 does not control the pretensioner 400 either.

Figure 9:
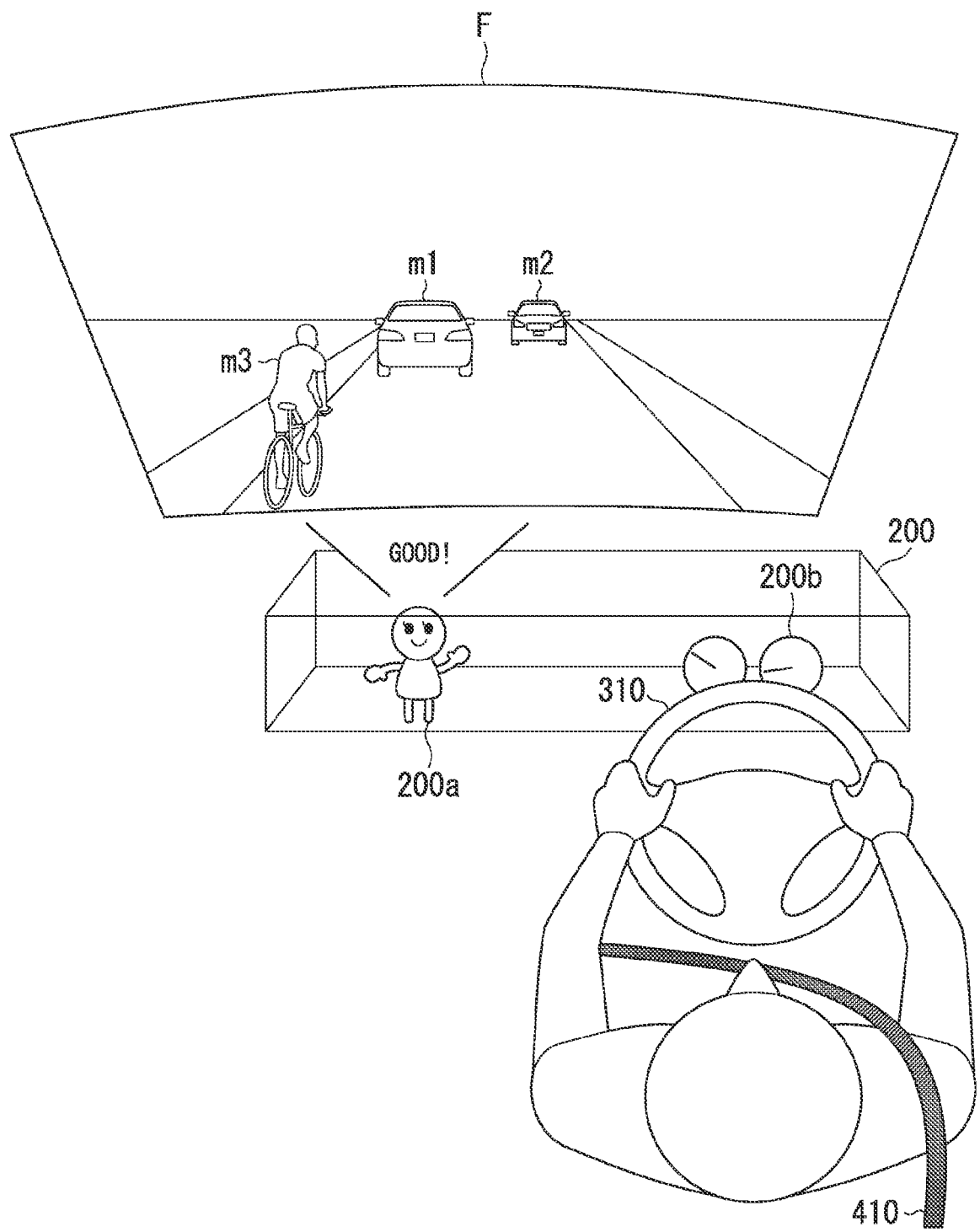
FIG. 9 is an explanatory view for another method of controlling each of the instruments in the scene of FIG. 7.

FIG. 9 is an explanatory view for another method of controlling each of the instruments in the scene of FIG. 7. In the example of FIG. 8, it has been described that the image objects $OB_{IMG}$ corresponding to the respective risk points PT in a one-to-one manner are displayed around the personified image 200a when the driver has directed a visual line or the face to all of the risk points PT. In place of or in addition to this, as illustrated in FIG. 9, in the first mode, the output controller 120 may cause a letter such as "good", a pictograph, a figure, or the like to be displayed around the personified image 200a. In addition, in order to make the control method more noticeably different from that at the time of eye-off (which will be described below), the output controller 120 may cause the image object $OB_{IMG}$ or a letter not to be displayed around the personified image 200a.

Figure 10:
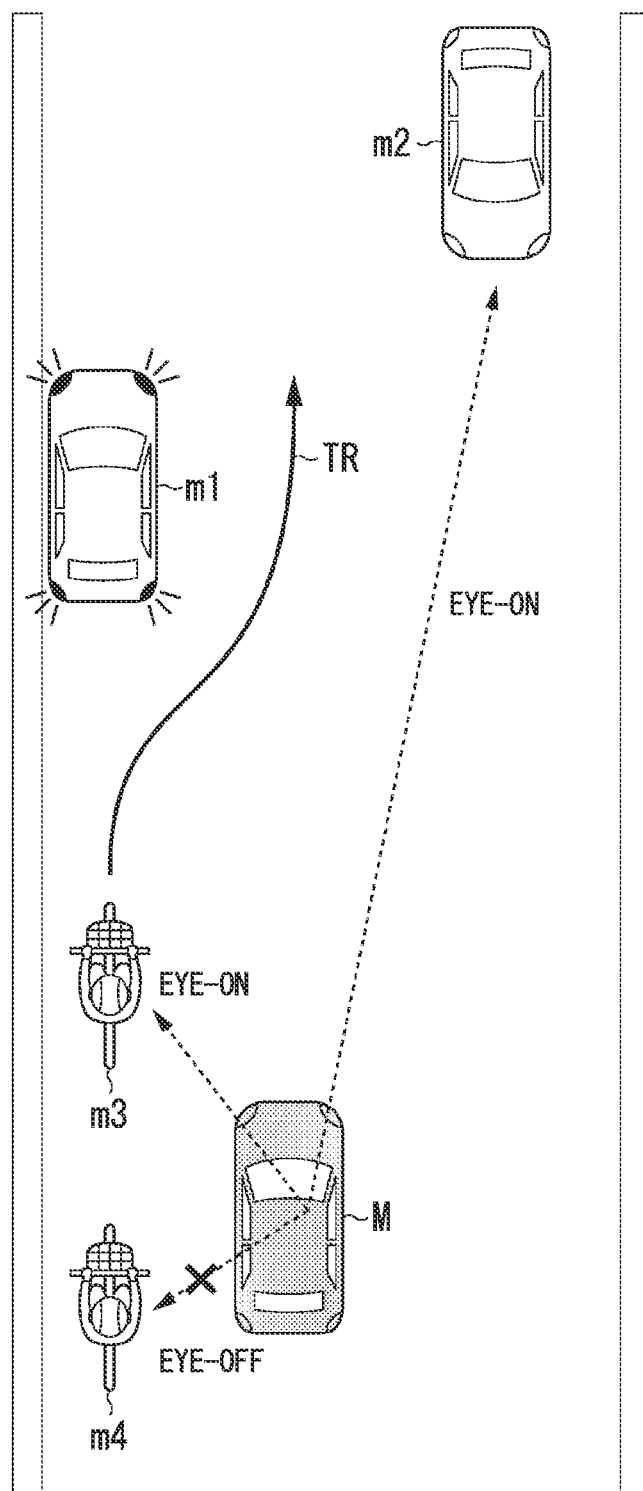
FIG. 10 is a view illustrating a scene in which a driver has not directed a visual line or the face to some risk points.

FIG. 10 is a view illustrating a scene in which a driver has not directed a visual line or the face to some risk points PT. In the scene of FIG. 10, the driver has not directed a visual line or the face to the bicycle m4 of the oncoming vehicle m2 and the bicycles m3 and m4 (the risk points PT). In such a case, the display device 200, the vibrator 300, and the pretensioner 400 are controlled by the control method which will be described below. Particularly, the display device 200 displays the personified image 200a or the image object $OB_{IMG}$ in the second mode.

Figure 11:
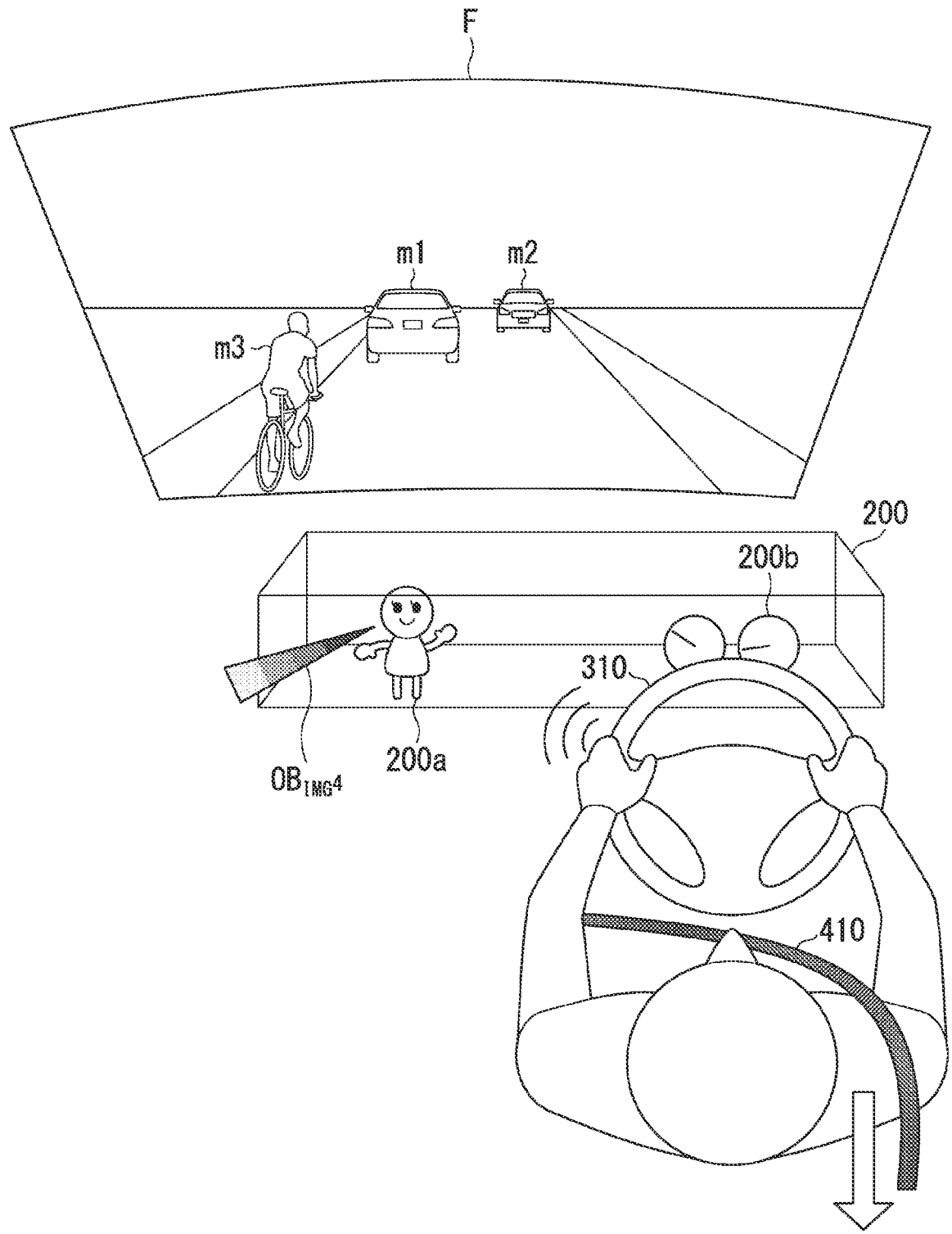
FIG. 11 is an explanatory view for a method of controlling each of the instruments in the scene of FIG. 10.

FIG. 11 is an explanatory view for a method of controlling each of the instruments in the scene of FIG. 10. In the scene of FIG. 10, although the driver has directed a visual line or the face to the oncoming vehicle m2 and the bicycle m3 (the risk points PT), the driver has not directed a visual line or the face to the bicycle m4. In such a case, in the second mode, the output controller 120 causes only the image object $OB_{IMG}$ corresponding to the risk point PT (the risk point PT in the eye-off state) to which the driver has not directed a visual line or the face to be displayed. Specifically, the output controller 120 causes only the image object $OB_{IMG}4$ indicating a direction in which the bicycle m4 is present to be displayed by being disposed around the personified image 200a.

When the driver has not directed a visual line or the face to some risk points PT, the vibration controller 130 controls the vibrator 300 to cause the steering wheel 310 to vibrate. Specifically, when the risk point PT to which the driver has not directed a visual line or the face is present on the left side of the host vehicle M from the viewpoint of the driver, the vibration controller 130 controls the vibrator 300 to cause a part of the steering wheel 310 (the rim, the spoke, or the like) on the left side from the viewpoint of the driver to vibrate more intensively than a part on the right side. On the contrary, when the risk point PT to which the driver has not directed a visual line or the face is present on the right side of the host vehicle M from the viewpoint of the driver, the vibration controller 130 controls the vibrator 300 to cause a part of the steering wheel 310 on the right side from the viewpoint of the driver to vibrate more intensively than a part on the left side.

In the illustrated scene, since the bicycle m4 is present behind the left side of the host vehicle M from the viewpoint of the driver, the vibration controller 130 causes a part of the steering wheel 310 on the left side to vibrate and does not cause a part of the steering wheel 310 on the right side to vibrate. Even if a part of the steering wheel 310 on the right side is not caused to actively vibrate, vibration at a part on the left side may be transferred thereto so that a part on the right side may passively vibrate. Even in such a case, in consideration of attenuation in vibration, vibration becomes more intensified at a part on the left side than at least a part on the right side.

When the driver has not directed a visual line or the face to some risk points PT, the tension controller 140 controls the pretensioner 400 to adjust the tension of the seatbelt 410. Specifically, when a certain risk point PT is present behind the host vehicle M from the viewpoint of the driver and the driver has not directed a visual line or the face to the risk point PT, the tension controller 140 controls the pretensioner 400 to intensify the tension of the seatbelt 410 compared to when the risk point PT is present behind the host vehicle M from the viewpoint of the driver and the driver has directed a visual line or the face to the risk point PT.

Figure 12:
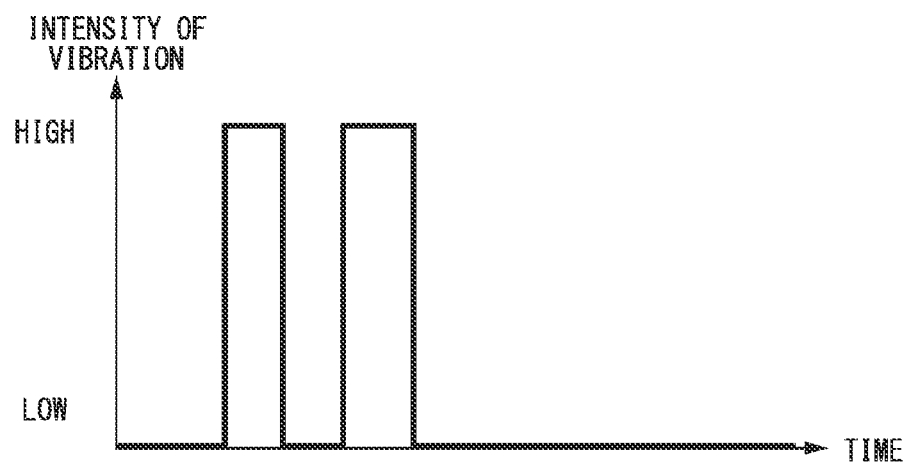
FIG. 12 is an explanatory view for a control timing of a vibrator.
Figure 13:
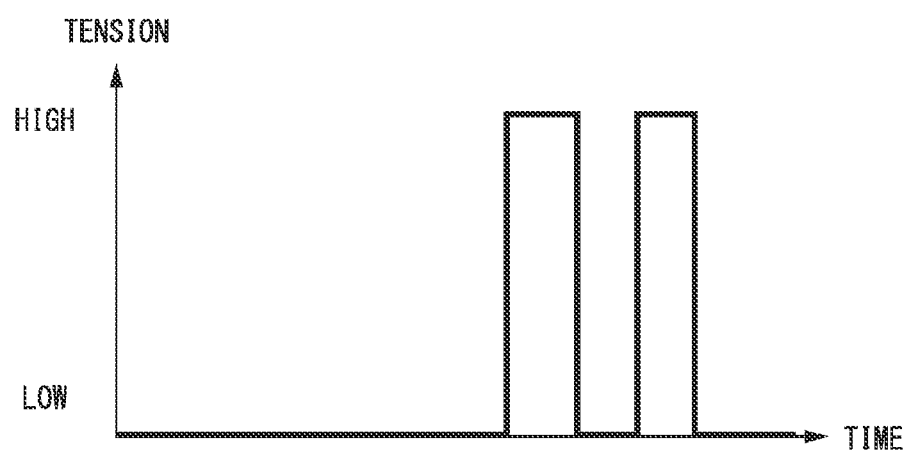
FIG. 13 is an explanatory view for a control timing of a pretensioner.

FIG. 12 is an explanatory view for a control timing of the vibrator 300, and FIG. 13 is an explanatory view for a control timing of the pretensioner 400. First of all, the vibration controller 130 controls the vibrator 300 to cause the steering wheel 310 to vibrate. For example, the vibration controller 130 may cause the steering wheel 310 to vibrate twice. After the steering wheel 310 has vibrated, the tension controller 140 controls the pretensioner 400 to intensify the tension of the seatbelt 410. Similar to those described above, the tension controller 140 may intensify the tension such that the seatbelt 410 is pulled twice. The number of vibrations in the steering wheel 310 and the number of pulls of the seatbelt 410 are not limited to twice, and they may be once or may be three times or more.

In this manner, since the seatbelt 410 is pulled after the steering wheel 310 is caused to vibrate with a time difference therebetween, it is possible to more intensively call driver's attention to that an obstacle to be watched carefully is present on the lateral side and in an oblique direction behind the host vehicle M. The timing for vibrating the steering wheel 310 and the timing for pulling the seatbelt 410 may be the same, or the steering wheel 310 may be caused to vibrate after the seatbelt 410 is pulled.

Figure 14:
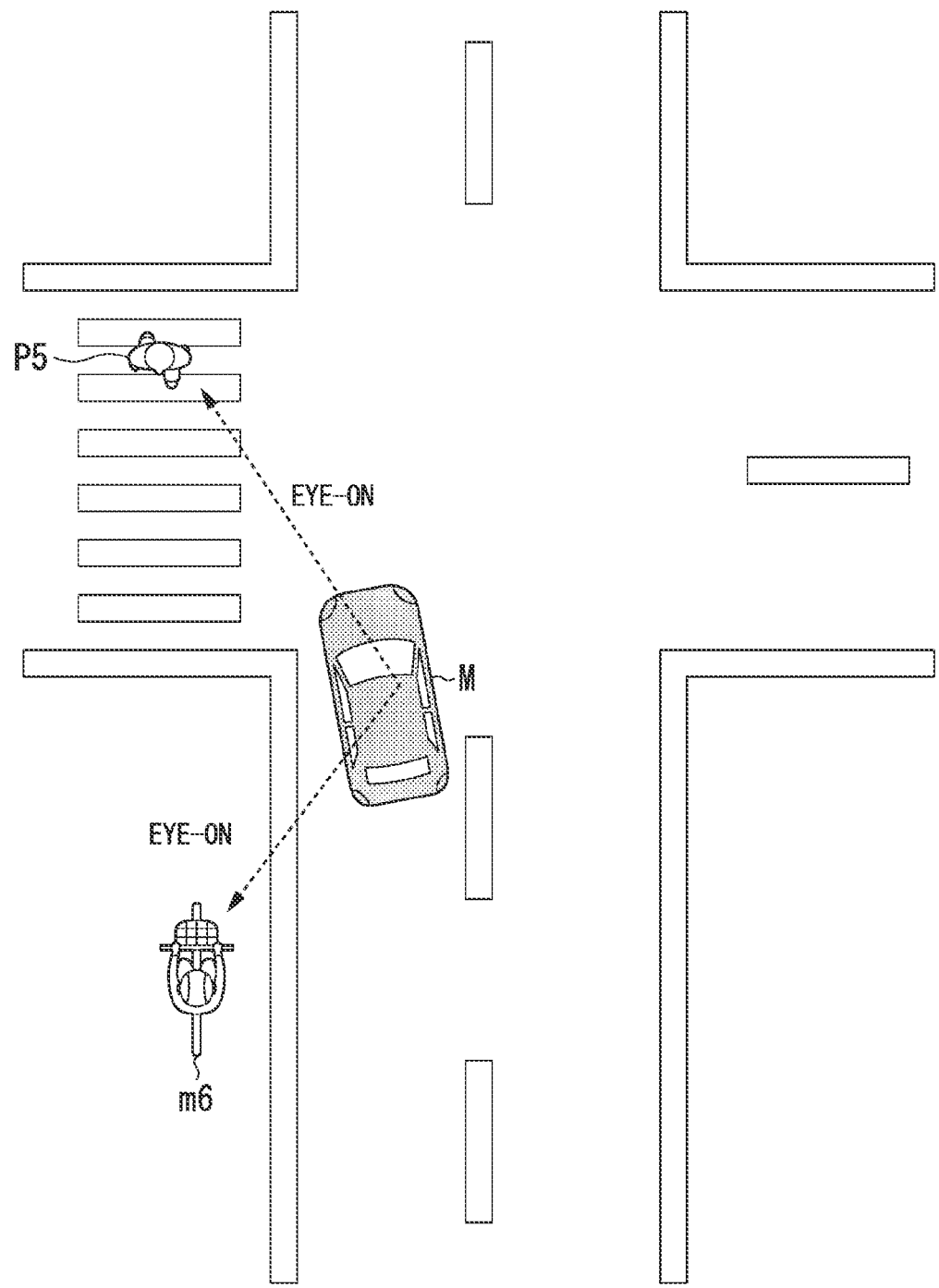
FIG. 14 is a view illustrating another scene in which a driver has directed a visual line or the face to all of the risk points.

FIG. 14 is a view illustrating another scene in which a driver has directed a visual line or the face to all of the risk points PT. The reference sign P5 in the diagram indicates a pedestrian who is crossing a crosswalk, and the reference sign m6 indicates a bicycle which travels on the left side of the host vehicle M. In the illustrated scene, both the pedestrian P5 and the bicycle m6 are regarded as the risk points PT, and the driver has directed a visual line or the face thereto.

Figure 15:
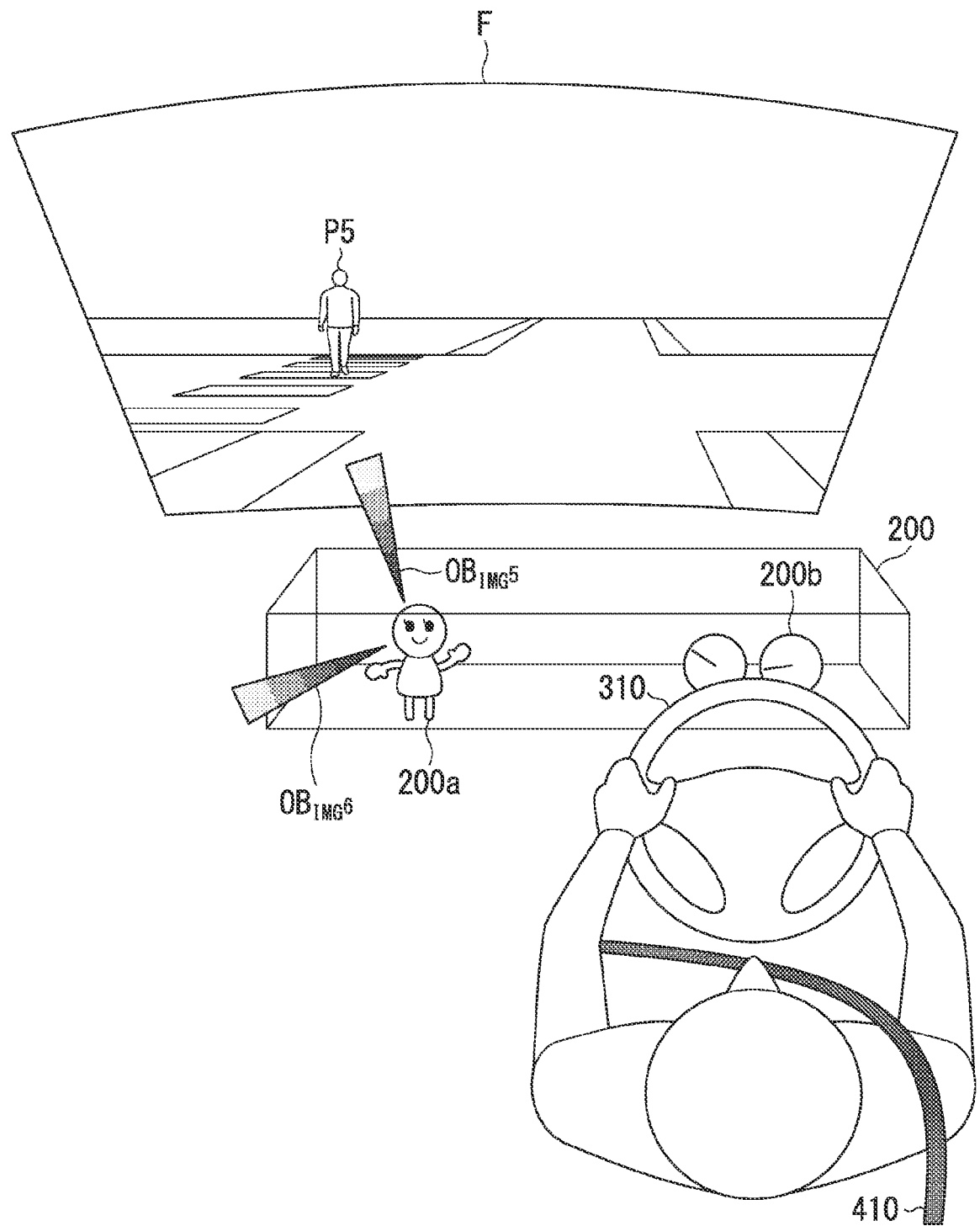
FIG. 15 is an explanatory view for a method of controlling each of the instruments in the scene of FIG. 14.

FIG. 15 is an explanatory view for a method of controlling each of the instruments in the scene of FIG. 14. Also in the scene of FIG. 14, similar to the scene of FIG. 7, in the first mode, the output controller 120 causes the image objects $OB_{IMG}$ to be displayed in directions in which the respective risk points PT are present. Specifically, the output controller 120 causes an image object $OB_{IMG}$5 indicating a direction in which the pedestrian P5 is present and an image object $OB_{IMG}$6 indicating a direction in which the bicycle m6 is present to be displayed by being disposed around the personified image 200a.

When the driver has directed a visual line or the face to all of the risk points PT, the vibration controller 130 does not control the vibrator 300, and the tension controller 140 does not control the pretensioner 400 either.

Figure 16:
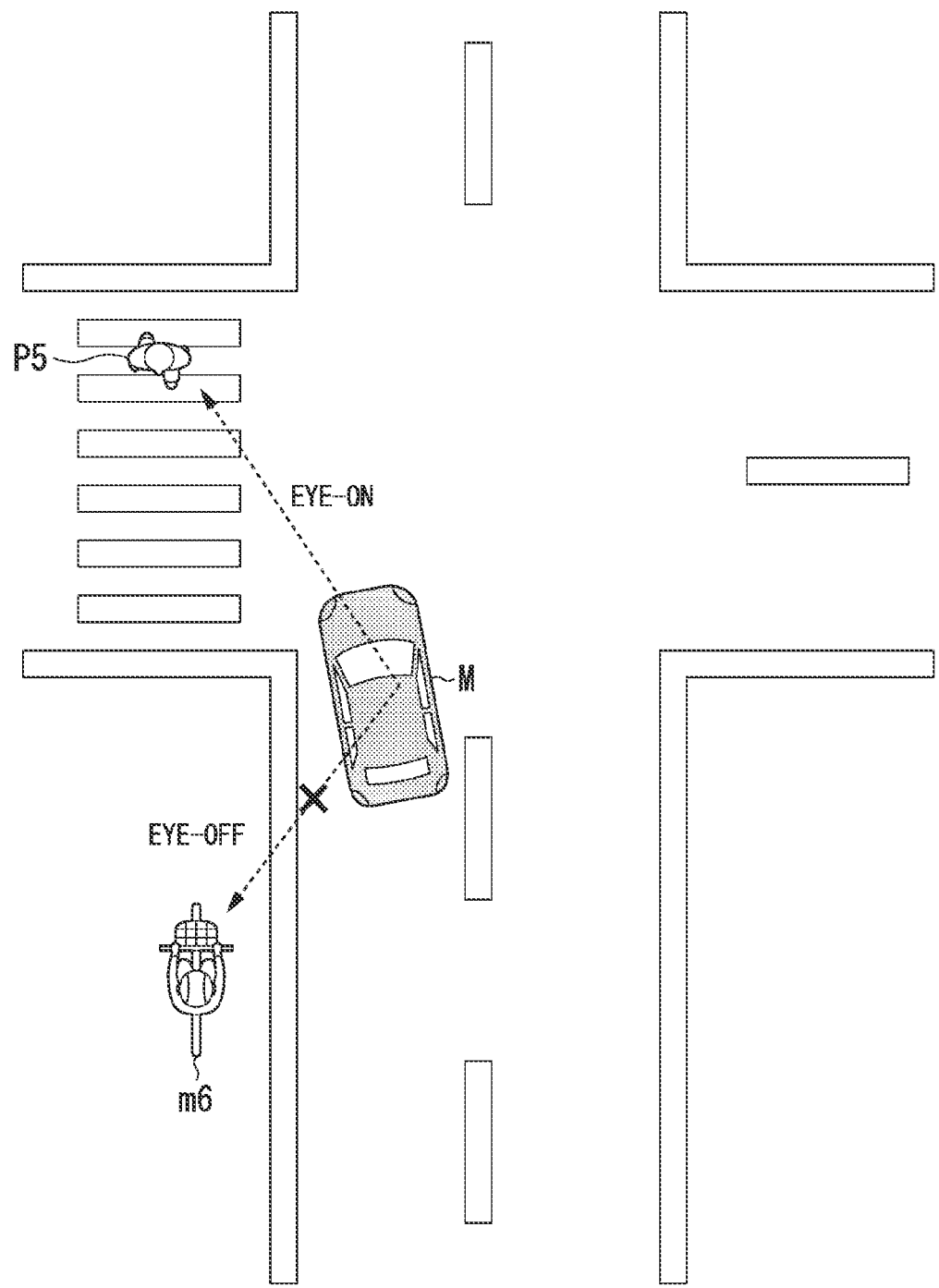
FIG. 16 is a view illustrating another scene in which a driver has not directed a visual line or the face to some risk points.

FIG. 16 is a view illustrating another scene in which a driver has not directed a visual line or the face to some risk points PT. In the scene of FIG. 16, the driver has not directed a visual line or the face to the bicycle m6 of the pedestrian P5 and the bicycle m6 (the risk points PT).

Figure 17:
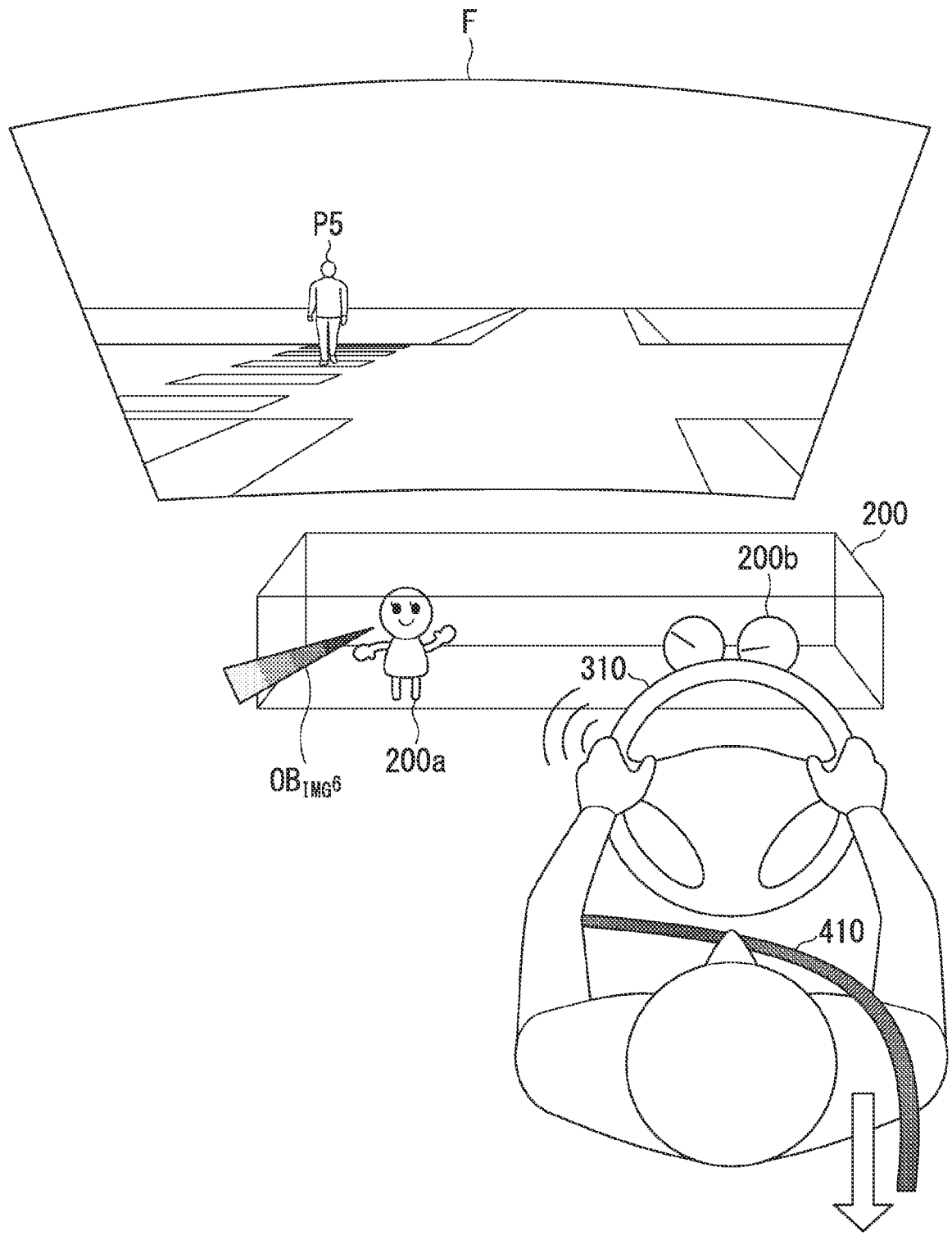
FIG. 17 is an explanatory view for a method of controlling each of the instruments in the scene of FIG. 16.

FIG. 17 is an explanatory view for a method of controlling each of the instruments in the scene of FIG. 16. In the scene of FIG. 16, although the driver has directed a visual line or the face to the pedestrian P5 (the risk point PT), the driver has not directed a visual line or the face to the bicycle m6. In such a case, in the second mode, the output controller 120 causes only the image object $OB_{IMG}$6 indicating a direction in which the bicycle m6 is present to be displayed by being disposed around the personified image 200a.

In addition, in the scene of FIG. 16, the vibration controller 130 controls the vibrator 300 to cause a part of the steering wheel 310 on the left side from the viewpoint of the driver to vibrate more intensively than a part on the right side. The tension controller 140 controls the pretensioner 400 to intensify the tension of the seatbelt 410 compared to when the driver has directed a visual line or the face to the bicycle m6 (the risk point PT).

Figure 18:
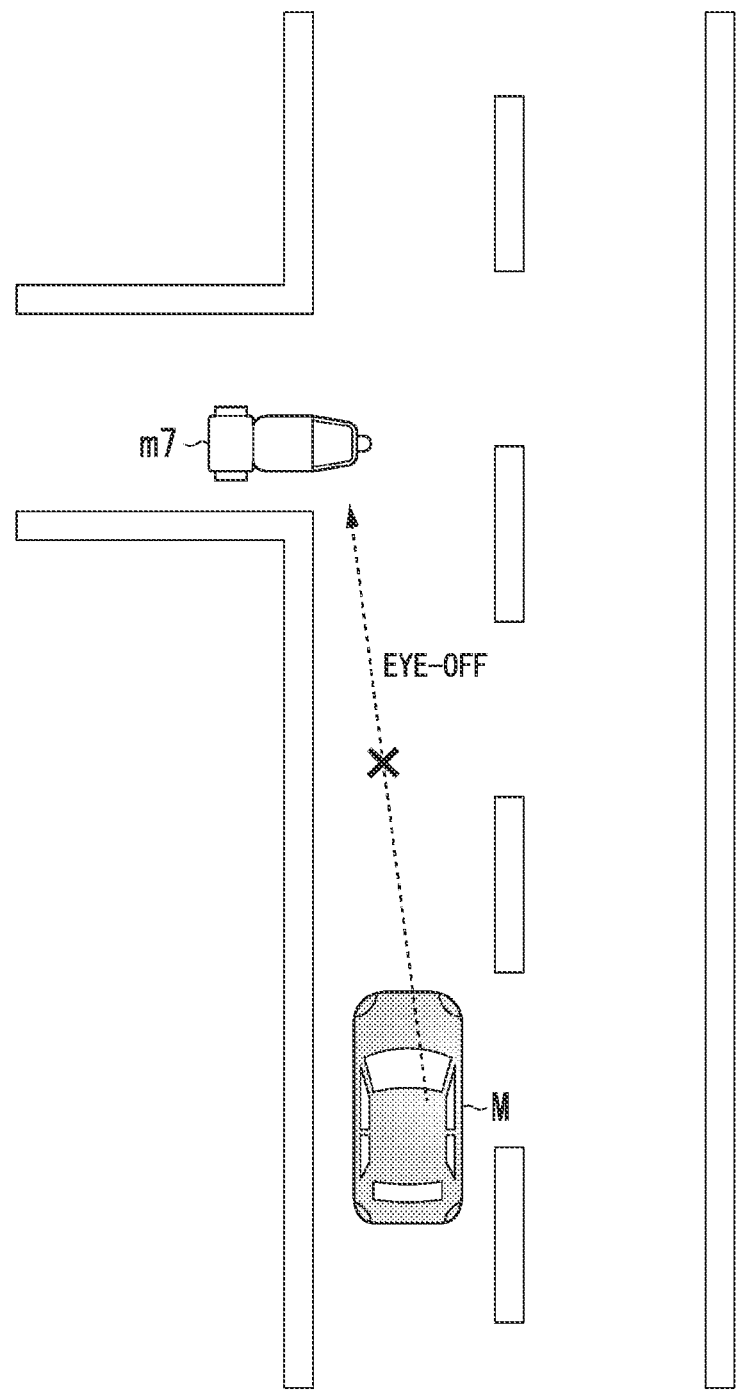
FIG. 18 is a view illustrating another scene in which a driver has not directed a visual line or the face to some risk points.

FIG. 18 is a view illustrating another scene in which a driver has not directed a visual line or the face to some risk points PT. The reference sign m7 in the diagram indicates a motorcycle which is attempting to enter a lane in which the host vehicle M travels (which will hereinafter be referred to as a host vehicle lane) in front of the host vehicle M. In the scene of FIG. 18, the driver has not directed a visual line or the face to the motorcycle m7 (the risk point PT).

Figure 19:
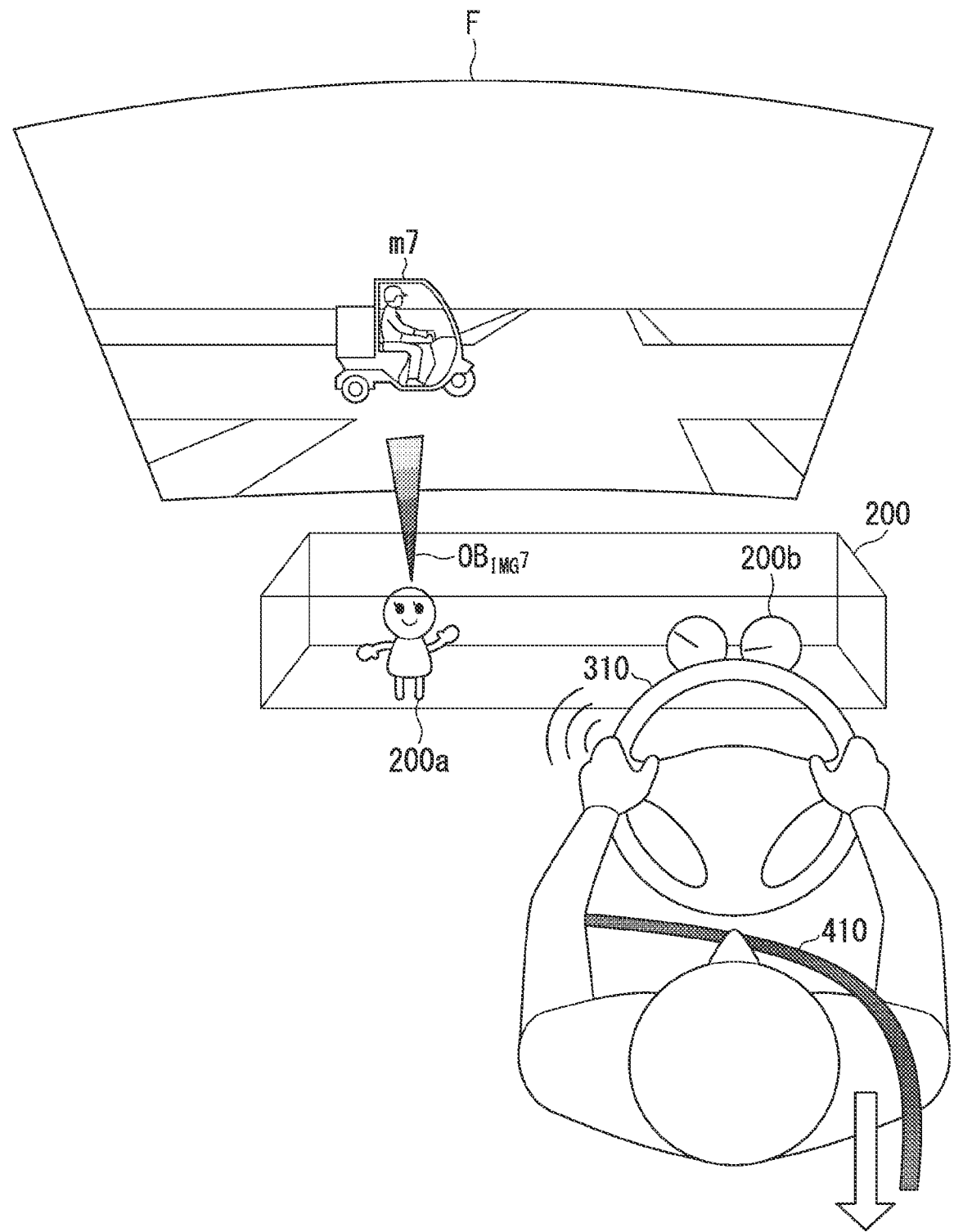
FIG. 19 is an explanatory view for a method of controlling each of the instruments in the scene of FIG. 18.

FIG. 19 is an explanatory view for a method of controlling each of the instruments in the scene of FIG. 18. In the scene of FIG. 18, the driver has not directed a visual line or the face to the motorcycle m7 (the risk point PT). In such a case, in the second mode, the output controller 120 causes an image object $OB_{IMG}$7 indicating a direction in which the motorcycle m7 is present to be displayed by being disposed around the personified image 200a.

In addition, in the scene of FIG. 18, since the motorcycle m7 is positioned on the left side from the viewpoint of the driver, the vibration controller 130 may cause a part of the steering wheel 310 on the left side to vibrate. The tension controller 140 controls the pretensioner 400 to pull the seatbelt 410 with a force weaker than that when the risk point PT is present behind the host vehicle M.

According to the embodiment described above, the vehicle seatbelt device 1 includes the object recognition device 16 that recognizes circumstances around the host vehicle M, the steering wheel 310 that is able to adjust steering of the host vehicle M (an example of the steering operator), the vibrator 300 that causes a portion of the steering wheel 310 to vibrate, the seatbelt 410 that restrains a portion of the body of a driver of the host vehicle M, the pretensioner 400 that is able to adjust the tension of the seatbelt 410 (an example of the tension adjustment mechanism), and the control device 100 that controls the vibrator 300 and the pretensioner 400 with a time difference on the basis of the risk point PT recognized by the object recognition device 16 and the direction of a visual line or the face of the driver to the risk point PT. Accordingly, the driver of the host vehicle M can be notified of the presence of an obstacle which is not recognized by the driver. As a result, safety of the driver of the host vehicle M and an area around the host vehicle M can be further improved.

Moreover, according to the embodiment described above, since the vibrating part of the steering wheel 310 varies in accordance with a direction, of directions to the left and the right from the viewpoint of the driver, in which the risk point PT having a high likelihood that the driver does not recognize (the risk point PT in the eye-off state) is present while the driver has not directed a visual line or the face to thereto, the driver can instinctively recognize the direction, of directions to the left and the right, in which attention has to be paid.

Moreover, according to the embodiment described above, since the tension of the seatbelt 410 is intensified when the risk point PT having a high likelihood that the driver does not recognize (the risk point PT in the eye-off state) is present behind the host vehicle M from the viewpoint of the driver while the driver has not directed a visual line or the face thereto, the driver can instinctively recognize that an obstacle to which attention has to be paid is present behind the host vehicle M.

Moreover, according to the embodiment described above, since the mode for displaying the personified image 200a or the image object $OB_{IMG}$ varies in accordance with a position where the risk point PT is present, the driver can be notified of the presence of an obstacle which is not recognized by the driver in a further emphasized manner.

Hereinabove, forms for performing the present invention have been described using the embodiment, but the present invention is not limited to the embodiment in any way. Various modifications and replacements can be added within a range not departing from the gist of the present invention.

What is claimed is:

1. A vehicle seatbelt device comprising:
    a recognizer that recognizes circumstances around a vehicle;
    a steering operator that is able to adjust steering of the vehicle;
    a vibrator that causes a portion of the steering operator to vibrate;
    a seatbelt that restrains a portion of the body of an occupant of the vehicle;
    a tension adjustment mechanism that is able to adjust a tension of the seatbelt;
    a controller that controls the vibrator and the tension adjustment mechanism on the basis of the circumstances recognized by the recognizer; and
    a detector that detects a direction of a visual line or the face of the occupant,
    wherein the controller controls the vibrator and the tension adjustment mechanism on the basis of the circumstances recognized by the recognizer and the direction detected by the detector,
    wherein when an object is present behind the vehicle, from a viewpoint of the occupant, and the occupant has not directed a visual line or the face to the object, the controller controls the tension adjustment mechanism to cause a tension of the seatbelt to be more intensified than when the object is present behind, from a viewpoint of the occupant, and the occupant has directed a visual line or the face to the object.

2. The vehicle seatbelt device according to claim 1,
    wherein the controller
    controls the vibrator to cause a part of the steering operator on a left side from a viewpoint of the occupant to vibrate more intensively than a part on a right side when the recognizer recognizes that the object is present on the left side, from a viewpoint of the occupant, and
    controls the vibrator to cause a part of the steering operator on the right side, from a viewpoint of the occupant, to vibrate more intensively than a part on the left side when the recognizer recognizes that the object is present on the right side, from a viewpoint of the occupant.

3. The vehicle seatbelt device according to claim 1,
    wherein the controller controls the tension adjustment mechanism to adjust a tension of the seatbelt when the recognizer recognizes that the object is present behind, from a viewpoint of the occupant.

4. The vehicle seatbelt device according to claim 1,
    wherein when the object is present around the vehicle and the occupant has not directed a visual line or the face to the object, the controller controls the vibrator to cause a part of the steering operator on a first side where the object is present to vibrate more intensively than a part of the steering operator on a second side where the object is not present.

5. The vehicle seatbelt device according to claim 1,
    wherein the controller controls the vibrator to cause the steering operator to vibrate and then controls the tension adjustment mechanism to adjust a tension of the seatbelt.

6. The vehicle seatbelt device according to claim 1 further comprising:
    an outputter that outputs information,
    wherein the controller causes the outputter to output information on the basis of the circumstances recognized by the recognizer.

7. The vehicle seatbelt device according to claim 6,
    wherein the outputter includes a display, and
    wherein the controller causes the display to display an image of a personified character.

* * * * *